United States Patent [19]

McDermott

[11] Patent Number: 5,457,877
[45] Date of Patent: Oct. 17, 1995

[54] APPARATUS AND METHOD FOR CUTTING THROUGH CABLE SHEATHINGS

[75] Inventor: Patrick M. McDermott, New Cumberland, Pa.

[73] Assignee: AT&T Corp., Murray Hill, N.J.

[21] Appl. No.: 267,054

[22] Filed: Jun. 27, 1994

[51] Int. Cl.[6] .................................................. H02G 1/12
[52] U.S. Cl. .................... 29/825; 29/426.4; 30/90.1; 30/90.7; 83/880; 83/947
[58] Field of Search .......................... 83/861, 879, 880, 83/881, 886, 887, 924, 947; 30/90.1, 90.3, 90.4, 90.6, 90.7, 90.8; 81/9.4, 9.51; 29/825, 426.4, 564.4

[56] References Cited

U.S. PATENT DOCUMENTS

| | | | |
|---|---|---|---|
| 3,364,801 | 1/1968 | Johnston | 81/9.51 |
| 3,748,932 | 7/1973 | Neiman et al. | 81/9.51 |
| 3,886,655 | 6/1975 | Molnar | 30/90.3 |
| 3,978,582 | 9/1976 | Maytham | 30/90.1 |
| 4,640,009 | 2/1987 | Liversidge | 30/90.8 X |
| 5,085,114 | 2/1992 | DeRoss et al. | 83/947 X |

*Primary Examiner*—Eugenia Jones

[57] ABSTRACT

Apparatus for cutting through the sheathing of a cable comprises a cutting wheel and a guide assembly including a guide box substantially enclosing the cutting wheel except for a portion extending through and beyond an end wall of the box. The box end wall abuts a plate extending perpendicular to the end wall and parallel to the cutting wheel. A slot through the plate has side and bottom walls extending parallel to the cutting wheel axle. In use, a cable in the slot extends axially towards and over the cutting wheel. A first cut is thus made in the cable in a plane perpendicular to the cable axis. By positioning the cable to extend axially parallel to the plate, an axially extending second cut is made. By extending the first cut entirely around the cable and intersecting the two cuts, a section of the cable sheathing is removed.

8 Claims, 5 Drawing Sheets

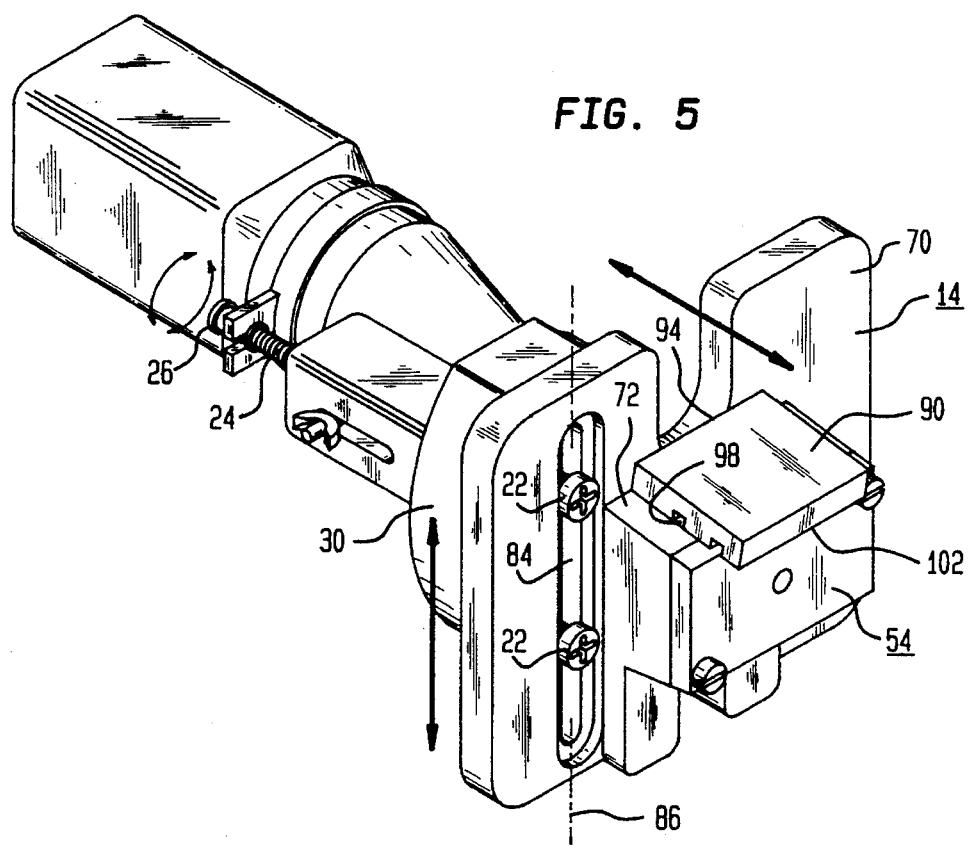
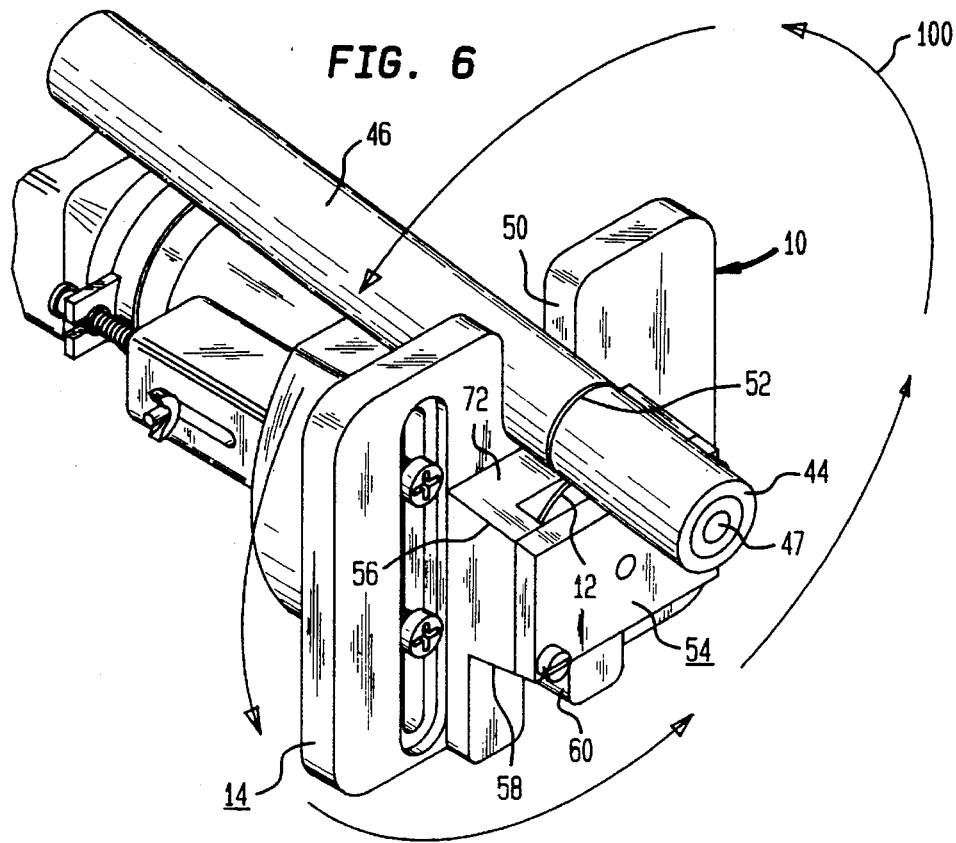

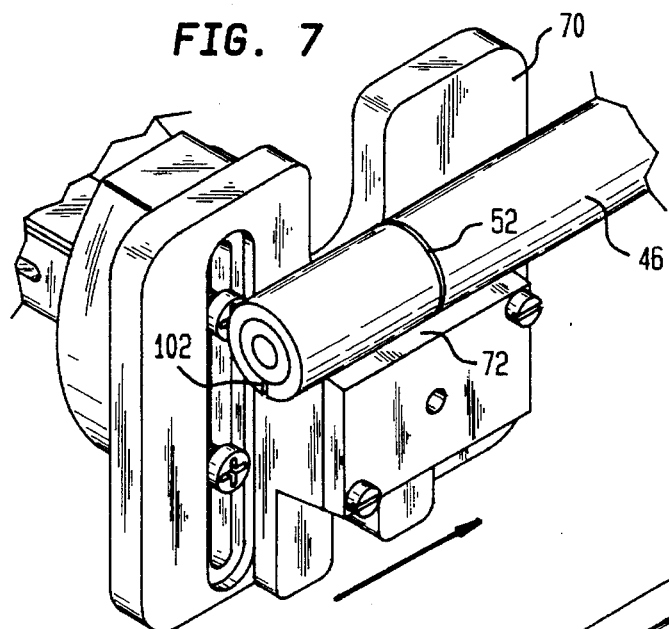
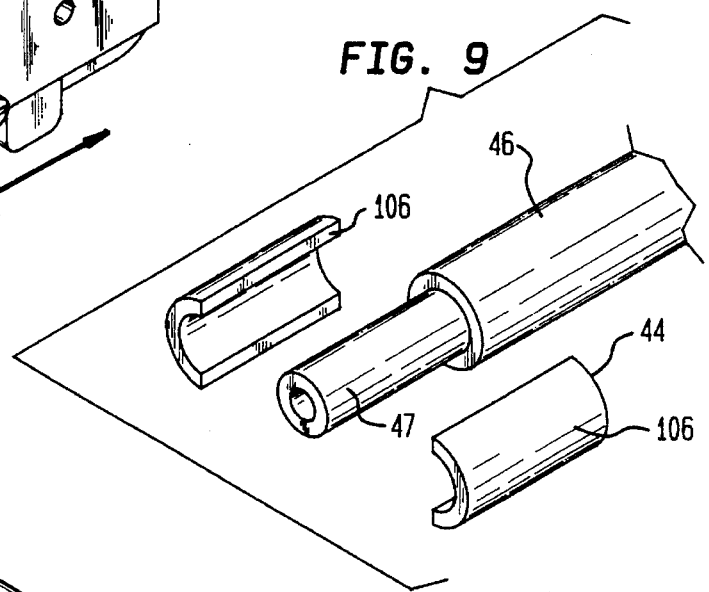
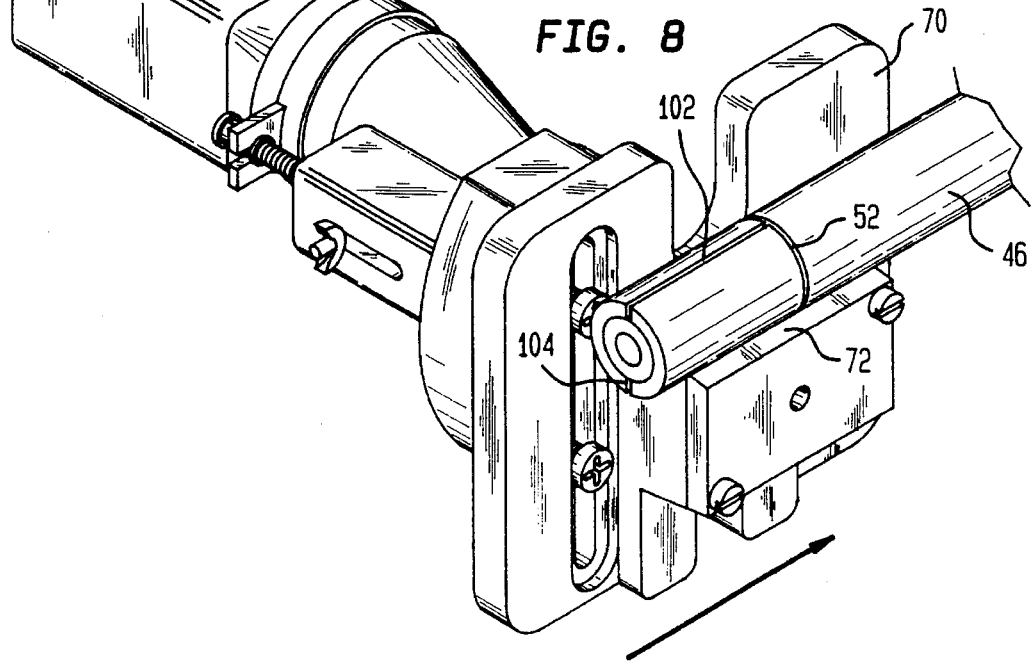

5,457,877

APPARATUS AND METHOD FOR CUTTING THROUGH CABLE SHEATHINGS

BACKGROUND OF THE INVENTION

This invention relates to an apparatus for cutting through the outer protective sheathing of a cable for exposing the core of the cable, and to a method for removing a section of the sheathing.

There are numerous instances where a plurality of individual wires, optic fibers and the like, each for conveying data, electric power and the like, are grouped together in a common cable (also referred to as a "harness"). The wires, fiber optics, etc., hereinafter referred to as "strands", are generally individually insulated and are tightly bunched together to form a central core which is wrapped around with a protective sheathing. At various points along the length of the cable it is necessary to cut through the protective sheathing for exposing various ones of the strands for splicing connections thereto. Generally, for providing access to all the cable strands at each splicing point in order to identify the particular strand or strands to be spliced, a short length of the sheathing is removed from around the entire periphery of the cable.

Traditionally, simple hand tools, e.g., knives and pliers-like cutters, are used by skilled technicians for cutting away the cable sheathings. In the cutting process, great care must be exercised to avoid cutting through the cable strands. Also, in instances where the cables are "armored", i.e., including metal layers and/or wire meshes in the protective sheathes, the cutting process can be quite difficult and time consuming. Additionally, raggedly cut edges of the metal layers can be dangerous.

SUMMARY OF THE INVENTION

A sheathing cutting apparatus includes a cutting wheel mounted for rotation on an axle and a guide assembly for controlling the contacting of a sheathed cable with the cutting wheel. The guide assembly includes a guide box for substantially enclosing the cutting wheel but including an opening through an end wall of the box through which an edge portion of the cutting wheel protrudes.

Adjoining the box end wall and perpendicular thereto is a guide plate having a slot therethrough extending from a side of the plate facing away from the end wall to a side of the plate adjoining the end wall. The slot has side and bottom walls extending parallel to the cutting wheel axle.

In use, a cable is disposed (by movement of the cable or by the apparatus) in the guide plate slot to extend outwardly therefrom and to overlie the box end wall and the extending cutting wheel. The plane of the cutting wheel is parallel to the guide plate, hence perpendicular to the axis of elongation of the cable. By pressing the cable inwardly of the plate slot towards the slot bottom wall and towards the box end wall, a cut is made by the cutting wheel into the cable sheathing. The depth of the cut is precisely equal to the length of the cutting wheel edge portion extending beyond the box end wall, and the cut extends radially inwardly of the cable.

Then, while maintaining the seated relationship of the cable within the plate slot end and against the box end wall, the apparatus is rotated around the cable, whereby a circular, radially extending groove is cut through the cable sheathing.

The cable is then removed from the plate slot and rotated 90 degrees from its previous position. As so re-oriented, the cable extends parallel to the guide plate and parallel to the guide box end wall. As mentioned, the plane of the cutting wheel is parallel to the guide plate, hence now parallel to the cable axis. The cutting wheel is spaced from the guide plate a distance equal to the radius of the cable. Then, by pressing the cable against the guide plate while also pressing the cable towards the box end wall, a cut is made in the cable sheathing which extends radially into and axially along the sheathing. The cable is then moved axially for extending the axial length of the cut. By combining one or more circular cuts with one or more axially extending cuts which intercept the circular cut or cuts, portions of the sheathing can be removed from the cable.

DESCRIPTION OF THE DRAWING

FIG. 5 is a partial view of the apparatus shown in FIG. 2 but on the scale of FIG. 3 and showing the gage block in use;

FIG. 6–8 are views similar to FIG. 5 and illustrating use of the inventive apparatus; and FIG. 9 is a view, in perspective, illustrating a sheathed cable partially desheathed by the process illustrated in FIGS. 6–8.

DESCRIPTION OF PREFERRED EMBODIMENTS

Figure 1:
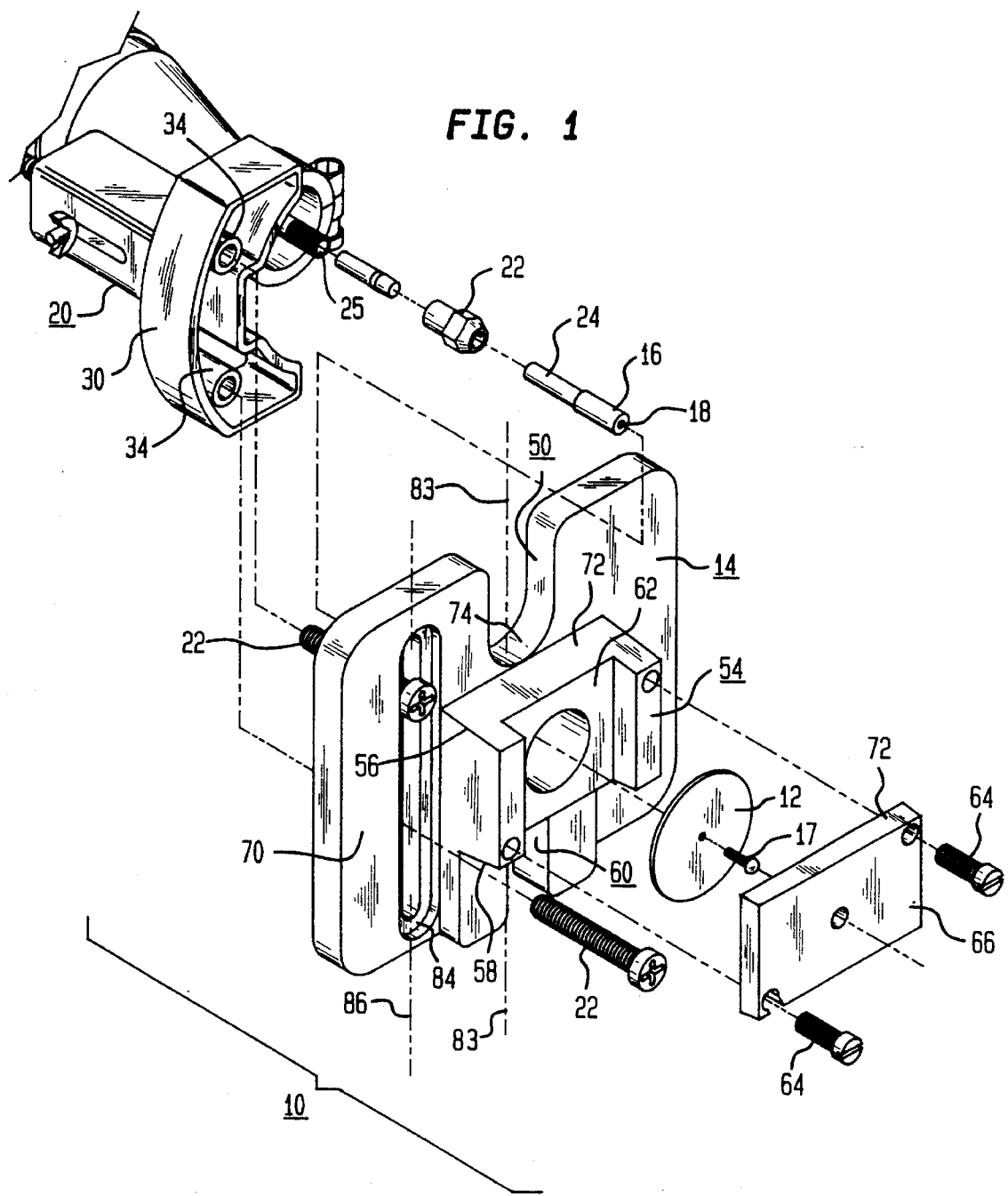
FIG. 1 is a view, in perspective and partially exploded, showing a cutting apparatus according to the invention plus a known power tool on which the inventive apparatus can be mounted and powered.
Figure 2:
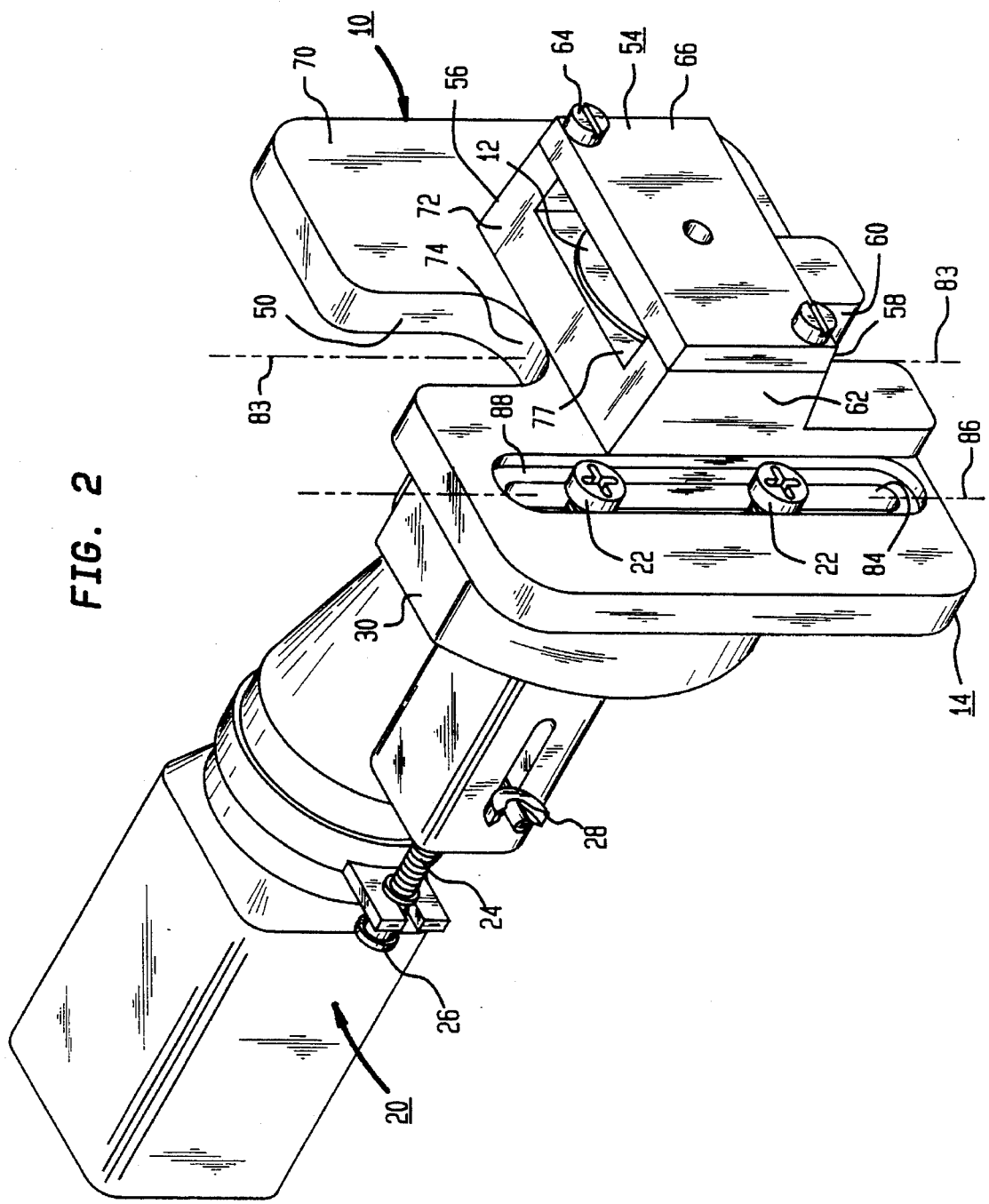
FIG. 2 shows the apparatus of FIG. 1 in assembled condition and mounted on the power tool.

With reference to FIGS. 1 and 2, a sheath cutting apparatus 10 according to the invention comprises two principal components, namely, a rotatable cutting wheel 12 and an enclosing, protective guide assembly 14. In use, the guide assembly 14 is fixed in place relative to the rotating cutting wheel 12. However, the guide assembly 14 is movable relative to the cutting wheel 14 for adjusting the apparatus for use with differently dimensioned cables.

The cutting wheel 12 can comprise, for example, a known cutting wheel selected depending upon the particular workpiece being cut through. For example, the protective sheath of a typical optical fiber cable includes, among other layers, a 2 mil thick layer of copper overlaid with a 2 mil thick layer of stainless steel. Twisted around the stainless steel layer is a mesh formed from 10 mil diameter stainless steel wires. The entire protective sheath, including outer and inner plastic material layers, has a thickness typically between 0.11– 0.175 inch. For use with such optical fiber cable, the cutting wheel 12 comprises, for example, a circular disc of abrasive fiber, e.g., iron oxide, or a diamond coated steel wheel. The wheel has a diameter of 1¼ inches.

The wheel 12 is rigidly attached to an axle or mandrel 16 by means of a screw 17 for rigidly clamping the wheel 12 against an end 18 of the mandrel, and the wheel 12 rotates with the mandrel. Known power rotary means, e.g., an electric drill, can be used for engaging and rotating the mandrel 16. In a preferred embodiment, however, the inventive apparatus is designed for use with a commercially available rotary power tool 20, e.g., a Dremel Tool, Model No. 850, which is designed for powering various tool attachments mountable thereon.

The power tool 20 comprises an enclosed electric motor including a known type arrangement 22, such as the chuck mechanism of a conventional electric drill, for clampingly receiving an end 24 of the mandrel 16. The chuck mechanism is attached to a rotatable armature 25 of the tool 20.

The power tool 20 also includes a bracket assembly 30 to which various commercially available tool attachments can be removably secured by means of elongated screws 22 received within internally threaded cylinders 34 mounted within the bracket assembly 30. For providing flexibility of use, with different tool attachments and with different workpieces, the bracket assembly 30 is mounted by known means for adjustable axial movement relative to the mandrel assembly. Briefly described, such adjustable mounting means comprises (FIG. 2) an elongated screw 24 and means, not shown, for moving the bracket assembly 30 axially relative to the screw 24 upon rotation of a knurled nut 26 attached to an end of the screw 24. When the bracket assembly 30 is adjusted in place, a wing nut 28 is tightened for firmly clamping the bracket assembly against the tool 20.

The guide assembly 14 used in combination with the cutting wheel 12 is now described.

Although the use of the cutting apparatus is described in some detail hereinafter, it is convenient to first refer to FIG. 6 which shows the cutting apparatus 10 in use for cutting through the protective sheathing 44 of an optic fiber cable 46. To this end, the cable 46 is disposed within a slot 50 of the apparatus 10 and against an exposed edge of the cutting wheel 12 (barely visible in FIG. 6). The apparatus 10 is rotated around the cable 46 for cutting a groove 52 through the protective sheath 44. The depth of the groove 52 is determined by the length of the portion of the cutting wheel 12 which extends outwardly from a guide box 54 which encloses most of the cutting wheel 12. As previously noted, the position of the guide assembly 14 relative to the cutting wheel 12 is adjustable for varying the length of the portion of the wheel extending outwardly from the guide box 54.

The guide box 54 can be adjusted relative to the cutting wheel 12 so that the cutting wheel 12 can extend partially outwardly from either of two opposite ends 56 and 58 of the guide box 54; that is, either in the direction of the slot 50 (in which is received the cable 46 as shown in FIG. 6), or in the direction of another slot 60 oppositely disposed to the slot 50. The slot 60 is aligned with the slot 50 but is dimensioned differently for receipt of cables having diameters different from the cables 46 received with the slot 50. Accordingly, depending upon which slot 50 or 60 is being used, and depending upon the adjusted length of the portion of the cutting wheel 12 extending outwardly from the guide box 54, the apparatus can be used with differently dimensioned cables.

As noted, the guide box 54 substantially encloses the cutting wheel 12 and, as shown in FIGS. 1 and 2, the guide box 54 comprises a generally U-shaped block 62 to which is removably attached, by means of screws 64, a guide cover 66.

The guide box 54 is fixedly attached to a generally flat plate 70 of the guide assembly 14, and is disposed between and in precise alignment with the two slots 50 and 60. Thus, the one end 56 of the guide box 54 comprises a flat mounting surface 72 formed from end surfaces of the block 62 and cover 66. The mounting surface 72 is tangent to a curved inner end 74 of the slot 50 such that when a cable 46 (FIG. 6) is disposed firmly in place against the inner end 74 of the slot 50, the cable 46 is simultaneously disposed firmly against the mounting surface 72 of the guide box 54. Accordingly, the groove 52 (FIG. 6) cut through the cable sheathing 44 lies in a plane perpendicular to the axis of the cable 46 and has a uniform depth around the entire periphery of the cable.

Figure 3:
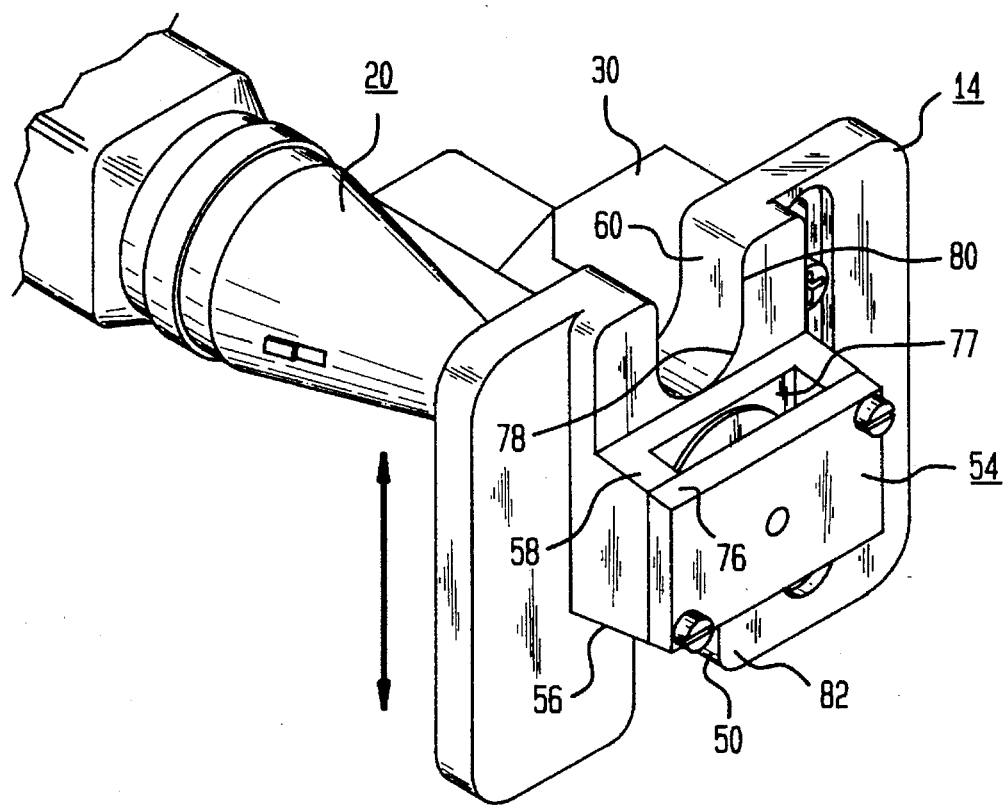
FIG. 3 is similar to FIG. 2 but on a reduced scale and showing both the inventive apparatus and the power tool rotated 180 degrees for showing certain details not visible in FIG. 2.

Similarly (FIG. 3), the other end 58 of the guide box 54 comprises a flat mounting surface 76 tangent to a curved inner end 78 of the slot 60. The walls 80 of the slot 60 have a greater thickness than the walls 82 of the slot 50. Accordingly, the width of the mounting surface 72 (FIG. 2) of the guide box 54 at the end 56 of the guide box is greater than the width of the mounting surface 76 (FIG. 3) at the guide box end 58. Additionally, the cutting wheel 14, as previously described, extends outwardly of the guide box 54 through a selected mounting surface 72 or 76 at opposite ends of the guide box. An opening 77 is provided through the end surfaces 72 and 76 for the cutting wheel 14. The width of the openings 77, in a direction along the wheel mandrel 16, is somewhat greater than the thickness of the wheel for allowing adjustment of the axial position of the cutting wheel 14 relative to the mounting surfaces 72 and 76. This is further discussed hereinafter.

For adjusting the length of the portion of the cutting wheel 12 which extends outwardly of the guide box 54, as well as selecting the end from which the wheel 12 extends, the guide assembly 14 is adjustably movable relative to the cutting wheel 12 along an axis 82 (FIG. 2) which is central to both slots 50 and 60. Such adjustable movement is provided by means of an elongated slot 84 through the plate 70 of the guide assembly 14. The axis 86 of elongation of the slot 84 is parallel to the central axis 82 of the two slots 50 and 60.

The two screws 22 previously described for mounting the apparatus 10 to the bracket assembly 30 pass freely through the slot 84, but have enlarged ends which engage a shoulder 88 within the slot 84. Thus, with the screws 22 received within the mounting cylinders 34 (FIG. 1 ) of the bracket assembly 30, the position of the entire guide assembly 14 relative to the cutting wheel 12 can be adjusted by loosening the screws 22, moving the guide assembly 14 along the axis 86 of the elongated slot 84, and then tightening the screws 22 against the slot internal shoulder 88.

Various arrangements can be used for selecting the desired position of the guide assembly 14 relative to the cutting wheel 12. For example, alignment marks or notches can be provided along the sides of the elongated slot 84 by means of which the guide assembly 14 can be adjusted in preselected relationship with respect to the screws 22 (which are in fixed relationship to the cutting wheel mandrel 16 axis via the bracket assembly 30).

Figure 4:
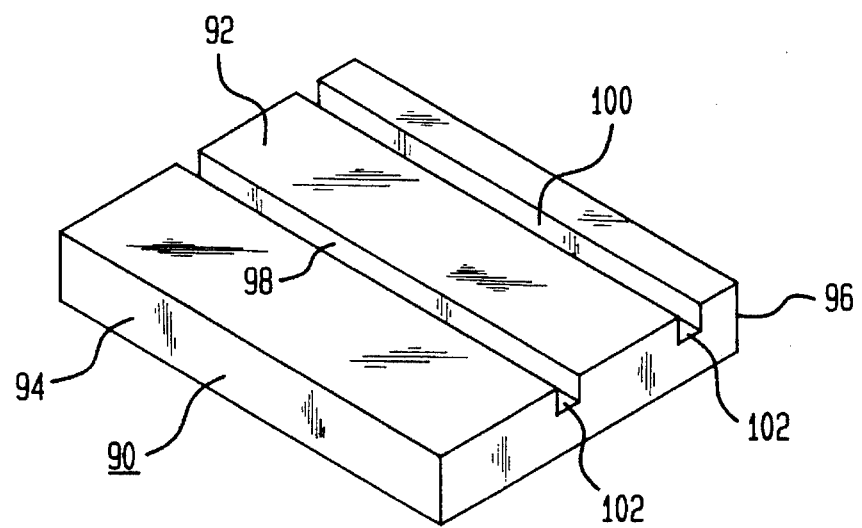
FIG. 4 is a view, in perspective, of a gage block useful for adjusting the depth of cut provided by the apparatus.

A preferred position selecting means, however, comprises a gage block 90 (FIG. 4) comprising a machined block of stainless steel having a top surface 92, two parallel side surfaces 94 and 96, and two (or more) slots 98 and 100 extending into the block 90 from the top surface 92. The slots 98 and 100 have side walls which are parallel to one another, parallel to the block side surfaces 94 and 96, and precisely spaced from the side surfaces. Each of the slots 98 and 100 has a bottom wall 102 parallel to the top surface 92 and precisely spaced therefrom. The depths of the two slots 98 and 100 are different and correspond to different depth cuts to be made in cables being cut. Likewise, the distance between the slots 98 and 100 and their corresponding side surfaces 94 or 96 are different, and each distance is equal to one-half the diameter of a cable to be cut.

In use of the gage block 90, the assembled together apparatus 10 is mounted on the power tool 20 (FIG. 2). The cutting wheel 12 is thus fixedly mounted on the mandrel 16 which is firmly attached to the rotatable armature 25 of the power tool 20. The two screws 22 extend through the elongated slot 84 of the guide assembly plate 70 and are threaded into the cylinders 34 of the bracket assembly 30 but not tightly. Depending upon the particular cable to the cut, one of the two slots 50 and 60 in the plate 70 is to be used, and the guide assembly 14 is first moved relative to the bracket assembly 30 for exposing a small portion of the cutting wheel 12 on the end of the guide box 54 facing towards the selected slot 50 or 60.

Assuming the slot 60 is to be used, the gage block 90 is mounted (FIG. 5) on the extending portion of the cutting wheel 12 with the wheel extending into a selected slot, e.g., slot 98 in the gage block 90, having a depth corresponding to the depth of the groove to be cut into the cable sheathing. Then, the guide assembly 14 is moved along the axis 86 of the elongated slot 84 as necessary for both firmly seating the outer edge of the cutting wheel 12 against the bottom wall 102 of the gage block slot 98 while firmly pressing the gage surface 92 against the guide box end surface 72. The elongated slot screws 22 are then screwed tightly for locking the guide assembly 14 against the power tool bracket assembly 30. The length of the portion of the cutting wheel extending beyond the end surface 72 of the guide box 54 is thus precisely set and is equal to the depth of the selected slot 98 in the guide block 90.

During the aforementioned set-up process (or prior to it), the axial position of the bracket assembly 30 (FIG. 2) relative to the elongated screw 24 is such that the cutting wheel 12 is disposed close to the forward end 66 of the guide box 54. The wheel 12 is thus spaced from the plate 70 a distance greater than the distance between the gage block slot 98 and the block side surface 94 adjacent thereto.

With the gage block 90 in place on the wheel 12 (FIG. 5), as above-described, the nut 26 at the end of the elongated screw 24 is rotated for axially moving the guide assembly 14 in a direction, along the axis of the wheel mandrel 16, for pressing the gage block side surface 94 against the plate 70. This sets the spacing between the plane of the cutting wheel 12 and the plate 70 equal to one-half the diameter of the cable being cut.

The apparatus is now ready for use with a cable having dimensions corresponding to the setting of the apparatus.

One such use is illustrated in FIGS. 6–9.

FIG. 6 shows a known type of fiber optic cable 46 comprising a central core 47 comprising a number of individual fiber optic strands surrounded by an armored protective sheath 44 of a type previously described. The cable 46 has a circular cross section and the sheath 44 has a uniform thickness. The apparatus 10 provides a uniformly deep cut through the sheath 44 allowing its removal without damage to the strands of the core.

Normally, in the field, the cable 46 is fixed in place, e.g., being attached to and strung between telephone poles, and the apparatus 10 is moved relative to the cable 46. Also, the power tool 20 is preferably self-powered, by means of a chargeable battery, hence without an extending power cord.

In FIG. 6, the cable 46 is shown disposed within the slot 50 with an end of the cable extending forwardly of the slot and overlying the cutting wheel 12. Power is turned on to rotate the wheel and the cutting apparatus is so moved towards the cable to firmly seat the cable within the slot 50 and against the mounting surface 72 of the guide box 54. The wheel 12 thus provides a cut into the sheath 44 which lies in a plane perpendicular to the cable axis and having a depth equal to the length of the segment of the cutting wheel 12 extending beyond the mounting surface 72.

While maintaining the cable fully seated within the slot 50 and pressed against the surface 72, the apparatus is rotated around the cable 46, as indicated by the arrows 100, to cut a circular groove 52 entirely around the cable and extending radially inwardly of the cable a uniform distance equal to the thickness of the sheath 44.

The apparatus is then removed from the cable 46, rotated 90 degrees and brought into contact with the cable as shown in FIG. 7. Thus, the surface of the guide plate 70 facing towards the cutting wheel 12 is placed against a side of the cable and the apparatus moved upwardly to drive the wheel 12 into the cable sheath to form a cut 102 (better visible in FIG. 8) extending axially along the cable.

As previously described, the cutting wheel 12 is spaced from the guide plate 70 a distance equal to one-half the diameter of the cable, hence the axially extending cut 102 lies in a plane intersecting the cable axis.

Then, the apparatus is moved axially along the cable, while being pressed against the plate 70 and the mounting surface 72, to extend the length of the cut 102. As evident from FIGS. 7 and 8, the cut 102, in this illustrated use, extends between the groove 52 and the end of the cable.

The apparatus is then rotated (FIG. 8) 180 degrees relative to the cable and a second cut 104, identical to the cut 102 but oppositely disposed thereto, is made along the cable.

Both cuts 102 and 104 extend from the cable end to the circular groove 52, hence, using a screw driver or the like, two segments 106 (FIG. 9) of the sheath 44 can be pried off the cable for exposing the cable core 47.

In another use, not illustrated, two spaced apart, circular grooves 52 are formed in the cable at a location spaced from an end of the cable. By joining the spaced apart circular grooves 52 by axially extending cuts similar to cuts 102 and 104, a length of the cable sheath 44 can easily be removed anywhere along the length of the cable.

What is claimed is:

1. A method for removing a section of a sheathing from a cable having an axis of elongation comprising disposing a sheathed cable within a slot through a plate and extending in a first direction outwardly from said slot and overlying a cutting wheel spaced from said plate, said wheel extending outwardly through an opening through a mounting surface extending perpendicularly to said plate, pressing said cable inwardly of said slot and towards said mounting surface for providing a first cut in said sheathing extending in a plane perpendicular to said cutting wheel axis, and rotating said cable relative to said cable for extending said cut entirely around said cable, disposing said cable against said plate and extending in a second direction perpendicular to said first direction and overlying said cutting wheel, pressing said cable towards said cutting wheel and against said mounting surface for providing a second cut in said sheathing extending in a plane parallel to said cable axis, and moving said cable relative to said cutting wheel along said second direction for extending the length of said second cut.

2. A method according to claim 1 including causing said first and second cuts to intersect.

3. A method according to claim 1 including positioning said first cut adjacent to an end of said cable, and extending said second cut from said first cut to said cable end.

4. A method according to claim 1 including providing two first cuts in spaced apart relation along said cable, and extending said second cut continuously between and intersecting both said first cuts.

5. Apparatus for cutting through sheathing of a cable comprising a cutting wheel mounted for rotation on an axle having an axis of elongation and a guide assembly for guiding a sheathed cable into contact with the cutting wheel for providing a controlled depth cut through the sheathing, said guide assembly including a guide box for partially enclosing said cutting wheel, said guide box including an end wall having an opening therethrough through which a segment of said wheel extends, said end wall forming, with an adjoining plate member, a pair of transverse surfaces for guiding a sheathed cable along a first direction into contact with said wheel, and a slot extending through said plate member from a first surface of said plate member facing away from said end wall to a second surface facing towards said end wall for guiding a sheathed cable along a second direction into contact with said wheel.

6. Apparatus according to claim 2 wherein said cutting wheel rotates within a plane parallel to and spaced from said plate member second surface.

7. Apparatus according to claim 6 wherein said slot has side and bottom walls which extend in directions parallel to said cutting wheel axle.

8. Apparatus according to claim 7 wherein said plate member includes an opening therethrough, said opening being elongated along an axis perpendicular to said slot wall extending directions, and securing means extending through said elongated opening for mounting said guide assembly on a power tool having a rotatable armature for coupling to and rotating said cutting wheel axle, and said plate member being adjustably movable relative to said securing means along said opening axis for adjustably fixing the length of said wheel segment extending through and beyond said end wall opening.

* * * * *